US012806463B2

(12) United States Patent
Breith

(10) Patent No.: US 12,806,463 B2
(45) Date of Patent: Nov. 24, 2026

(54) FIRE EXTINGUISHING COMPOSITIONS FOR LARGE FIRES

(71) Applicant: FIREXO COTM LIMITED, Amersham (GB)

(72) Inventor: David Breith, Beaconsfield (GB)

(73) Assignee: FIREXO COTM LIMITED, Amersham (GB)

( * ) Notice: Subject to any disclaimer, the term of this patent is extended or adjusted under 35 U.S.C. 154(b) by 432 days.

(21) Appl. No.: 17/927,289

(22) PCT Filed: May 26, 2021

(86) PCT No.: PCT/GB2021/051284
§ 371 (c)(1),
(2) Date: Nov. 22, 2022

(87) PCT Pub. No.: WO2021/240154
PCT Pub. Date: Dec. 2, 2021

(65) Prior Publication Data

US 2023/0201646 A1 Jun. 29, 2023

(30) Foreign Application Priority Data

May 27, 2020 (GB) ...................................... 2007892

(51) Int. Cl.
*A62D 1/00* (2006.01)

(52) U.S. Cl.
CPC .................................. *A62D 1/0042* (2013.01)

(58) Field of Classification Search
CPC ................................ A62D 1/0042; A62D 1/00
See application file for complete search history.

(56) References Cited

U.S. PATENT DOCUMENTS

| | | | | |
|---|---|---|---|---|
| 2014/0138104 A1* | 5/2014 | Robinet | ............. | A62C 99/0036 169/46 |
| 2017/0056698 A1* | 3/2017 | Pai | ....................... | A62D 1/0042 |

FOREIGN PATENT DOCUMENTS

| | | | |
|---|---|---|---|
| CN | 106 039 627 | A | 10/2016 |
| CN | 107 376 181 | A | 11/2017 |
| CN | 107 812 340 | A | 3/2018 |
| DE | 3735707 | A1 | 5/1989 |
| FR | 2 102 933 | A5 | 4/1972 |
| GB | 2 561 610 | A | 10/2018 |
| JP | 2004208831 | A | 7/2004 |
| WO | WO 2020/084277 | | 4/2020 |

OTHER PUBLICATIONS

Interantional Search Report and Written Opinion of PCT/GB2021/051284 mailed Feb. 8, 2021; 9 pages.
Patent Act 1977: Search Report under Section 17(5) of Application No. GB20077892.9 dated Aug. 24, 2021; 5 pages.
Database WPI, Week 201712, Thomson Scientific, London, GB, AN 2016-69380U, XP002803924.
Dafo Fomtec AB, Fomtec® AFFF 3%, foam concentrate; revised on Nov. 12, 2013 (1 page).

* cited by examiner

*Primary Examiner* — Andrew J. Oyer
(74) *Attorney, Agent, or Firm* — Squire Patton Boggs (US) LLP

(57) ABSTRACT

A fire extinguishing composition is described. The fire extinguishing composition comprises water in an amount of ≤80.0% by weight; a fire extinguishing salt in an amount of ≥15.0% by weight; and a wetting agent; wherein the wetting agent comprises a non-fluorinated surfactant. Uses of the fire extinguishing composition and a fire extinguisher comprising the fire extinguishing composition are also described.

35 Claims, No Drawings

FIRE EXTINGUISHING COMPOSITIONS FOR LARGE FIRES

This patent application claims priority to, and the benefit of, International Patent Application number PCT/GB2021/051284, filed May 26, 2021, which claims benefit to United Kingdom application number 2007892.9, filed May 27, 2020, wherein the contents of both are incorporated herein by reference in their entirety for all purposes.

FIELD OF THE INVENTION

The invention relates to a fire extinguishing composition. The invention also relates to a method or use of the fire extinguishing composition. The invention further relates to a method of manufacturing the fire extinguishing composition.

BACKGROUND TO THE INVENTION

Large fires can be hazardous when they become out of control and can cause serious injury or result in the loss of life to humans and animals as well as large damage to property and the environment.

Large fires such as wildfires, bush fires, moor fires and large-scale building fires are tackled by fire fighters in nearly all cases typically with water. However, to extinguish a fire of such a magnitude, vast amounts of water are needed. For example, 1 acre of a wildfire would take about 102,000 litres of water to put the fire out. One recent wildfire covered 46,000,000 acres meaning an estimated 4,728,294,000,000 litres of water was needed to extinguish it. Simply put, fire fighters could not obtain that much water, so it was impossible to put the fire out, or at least to extinguish it quickly. If it is not possible to contain the fire, then it spreads and can move quickly. Fire fighters are placed in the dangerous position of having to rapidly retreat from the fire rather than being able to tackle it. These shortcomings can lead to injury or death and often result in the need to evacuate towns and villages with the possibility of damage to property. Such fires typically burn for long periods of time and cause significant damage to the environment.

Another problem with large scale fires is the damage left afterwards. In forested areas, it can take 2 to 4 years before reforestation can begin.

In 2019, there were 4.5 million wildfires that each covered an area larger than one square kilometre. There were also an estimated 2 million large scale building fires. These fires emit significant quantities of $CO_2$, which contributes to climate change that can create conditions for further fires.

SUMMARY OF THE INVENTION

The invention provides a fire extinguishing composition comprising:

water in an amount of ≤80.0% by weight;

a fire extinguishing salt in an amount of about 15.0% by weight; and a wetting agent;

wherein the wetting agent comprises a non-fluorinated surfactant.

An advantageous fire extinguishing composition has been developed that can be used to rapidly extinguish or suppress and stop the spread of large-scale fires. Fires may be extinguished using a relatively low quantity of the fire extinguishing composition, particularly when compared to the quantity of water that is needed to extinguish the same fire. The fire extinguishing composition can also be diluted in regular water whilst remaining effective. A further advantage of the fire extinguishing composition, particularly when used to extinguish fires in the wild, is that the remnant can act as a fertiliser for plant growth.

The fire extinguishing composition of the invention is environmentally friendly and is readily biodegradable. It does not persist in the environment and it is not bioaccumulative (e.g. it is not Persistent, Bioaccumulative and Toxic (PBT), nor very Persistent and very Bio-accumulative (vPvB)). The fire extinguishing composition is non-toxic and is generally non-hazardous to fauna and flora.

Unlike many other fire extinguishing compositions, the fire extinguishing composition of the invention does not comprise a fluorinated compound, such as a fluorinated surfactant. For example, the composition does not contain per- and polyfluoroalkyl substances (PFAS), such as perfluorooctanoic acid (PFOA) or perfluorooctanesulfonic acid (PFOS).

In general, the fire extinguishing composition of the invention has no Global Warming Potential (GWP) and/or no Ozone Depletion Potential (ODP).

The invention also provides a fire extinguisher product. The fire extinguisher product comprises a container comprising the fire extinguishing composition.

The invention further relates to a method of manufacturing a fire extinguishing composition. The method comprises mixing a fire extinguishing salt with a wetting agent in water, such that the fire extinguishing composition comprises water in an amount of ≤80.0% by weight and the fire extinguishing salt in an amount of 15.0% by weight.

The invention also provides a method of extinguishing a fire. The method comprises administering or applying a fire extinguishing composition to the fire. The fire extinguishing composition is in accordance with the invention. The fire extinguishing composition is typically administered or applied to extinguish the fire and/or to suppress or retard the spread of the fire (e.g. the fire extinguishing composition is applied or administered in such a way as to facilitate maximum impact to a fire).

The invention also relates to the use of the fire extinguishing composition to extinguish a fire and/or to reduce or prevent a fire from spreading. Additionally or alternatively, the invention also relates to the use of the fire extinguishing composition as a fertilising agent for plant growth (e.g. re-growth of plants that have been damaged by the fire).

DETAILED DESCRIPTION OF THE INVENTION

The invention relates to a fire extinguishing composition. For the avoidance of doubt, the term "fire extinguishing" in the context of the composition embraces fire suppression or retardation, in addition to fire extinction, unless the context indicates otherwise.

The fire extinguishing composition of the invention comprises water. The water may dissolve the fire extinguishing salt to ensure that the composition is free flowing and easier to administer. The water also provides a liquid vehicle to assist with delivery of the composition to a fire, such as from a vehicle or a hand held fire extinguisher. The water may assist with extinguishing a fire by cooling or by soaking the area surrounding the fire. The water can also assist with the distribution into the ground of components from the fire extinguishing composition that can act as a fertiliser for plants.

Any reference as used herein to "% by weight", unless the context indicates otherwise, relates to a % by weight of the fire extinguishing composition.

The fire extinguishing composition comprises water in an amount of less than or equal to 80.0% by weight. Thus, the fire extinguishing composition comprises water in an amount of ≤80.0% by weight, preferably <75.0% by weight (e.g. <74.0% by weight). More preferably, the amount of water is ≤70.0% by weight, such as ≤69.0% by weight.

As the fire extinguishing composition comprises water, then the composition comprises water in an amount of >0.0% by weight. Thus, the composition comprises an amount of water of up to 80.0% by weight, preferably up to 75.0% by weight (e.g. up to 74.0% by weight). More preferably, the amount of water is up to 70.0% by weight, such as up to 69.0% by weight.

It is preferred that the fire extinguishing composition comprises water in an amount ≥35.0% by weight, more preferably ≥40.0% by weight, such as ≥45.0% by weight, and even more preferably ≥50.0% by weight, and still more preferably ≥55.0% by weight. Enough water should be included to dissolve the fire extinguishing salt component(s). The dissolution of the fire extinguishing salt component(s) may be aided by other components of the fire extinguishing composition, such as the wetting agent.

Thus, the amount of water is typically from 35.0 to 80.0% by weight, preferably from 40.0 to 75.0% by weight, such as 45.0 to 70.0% by weight, and more preferably 50.0% to 69.0% by weight. It may be preferable for the amount of water to be from 55.0 to 75.0% by weight.

For the avoidance of doubt, the amount of water described hereinabove refer to an undiluted composition or a stock fire extinguishing composition. In some instance, the composition can, however, be used in a diluted form. The weight ratio of fire extinguishing salt(s) to the wetting agent remains the same when the composition is diluted. This ratio can affect the fire extinguishing efficacy of the composition, whether diluted or otherwise.

The fire extinguishing composition of the invention comprises a fire extinguishing salt. Fire extinguishing salts are used to coat, cool, blanket, smother, extinguish or retard a fire.

The term "fire extinguishing salt" as used herein, particularly with reference to a fire extinguishing salt comprising a phosphate salt, a sulphate salt or a carbonate salt, refers to a compound comprising an inorganic anion, preferably the compound is an inorganic compound. The terms "inorganic anion" or "inorganic compound" in this context refer to an anion or compound, respectively, that does not comprise a carbon-hydrogen (C—H) bond or a carbon-carbon (C—C) bond. For example, a fire extinguishing salt comprising a sulphate salt refers to a compound containing a $SO_4^{2-}$anion, such as sodium sulphate ($Na_2SO_4$), potassium sulphate ($K_2SO_4$) or ammonium sulphate ($(NH_4)_2SO_4$)).

The fire extinguishing composition comprise the fire extinguishing salt(s) in an amount of 15% by weight. It is preferred that the amount of fire extinguishing salt(s) is ≥20% by weight, such as ≥25% by weight, more preferably ≥30% by weight, such as ≥35% by weight, and even more preferably ≥40% by weight. For the avoidance of doubt, the amount refers to the total amount of fire extinguishing salt(s).

Enough fire extinguishing salt should be present in the composition to extinguish or hold a fire back in retardant situations.

In general, the fire extinguishing, retardant and fertilising composition comprises the fire extinguishing salt(s) in an amount of ≤60.0% by weight, such as ≤55.0% by weight, preferably ≤50.0% by weight, such ≤45.0% by weight, and even more preferably ≤40.0% by weight. It can be difficult to dissolve the fire extinguishing salt in water if too much of the salt is present in the composition. This can affect the physical form of the fire extinguishing composition and may reduce its easy liquid flow characteristics.

Typically, the total amount of fire extinguishing salt(s) is 20.0 to 60.0% by weight (e.g. 20.0 to 40.0% by weight), preferably 25.0 to 55.0% by weight, such as 30.0 to 50.0% by weight, and even more preferably 35.0 to 45.0% by weight.

Typically, the fire extinguishing salt comprises, or consists essentially of, a phosphate salt. The phosphate salt may be a sodium phosphate salt, an ammonium phosphate salt, or an iron phosphate salt. It is preferred that the phosphate salt is an ammonium phosphate salt. In addition to their fire extinguishing properties, phosphate salts can act as fertilisers for plants.

The sodium phosphate salt may be selected from trisodium phosphate ($Na_3PO_4$), sodium hydrogen phosphate ($Na_2HPO_4$), sodium dihydrogen phosphate ($NaH_2PO_4$), monosodium diphosphate ($NaH_3P_2O_7$), disodium diphosphate ($Na_2H_2P_2O_7$), trisodium diphosphate ($Na_3HP_2O_7$), tetrasodium diphosphate ($Na_4P_2O_7$), sodium triphosphate ($Na_5P_3O_{10}$), sodium trimetaphosphate ($Na_3P_3O_9$) and a mixture of two or more thereof.

The iron phosphate salt maybe selected from iron (II) phosphate ($Fe_3(PO_4)_2$), iron (III) phosphate ($FePO_4$) and a mixture thereof. It is preferred that the iron phosphate salt is ferric phosphate (e.g. iron (III) phosphate ($FePO_4$)).

The ammonium phosphate salt may be selected from monoammonium phosphate ($NH_6PO_4$), ammonium polyphosphate ($[NH_4PO_3](OH_2)$), diammonium phosphate ($(NH_4)_2HPO_4$) and a mixture of two or more thereof. It is preferred that the ammonium phosphate is selected from monoammonium phosphate ($NH_6PO_4$), diammonium phosphate ($(NH_4)_2HPO_4$) and a mixture thereof. More preferably, the ammonium phosphate salt is diammonium phosphate ($(NH_4)_2H_2PO_4$) or a mixture of diammonium phosphate ($(NH_4)_2H_2PO_4$) and monoammonium phosphate ($NHrPO_4$). Even more preferably, the ammonium phosphate salt is diammonium phosphate ($(NH_4)_2H_2PO_4$).

The fire extinguishing salt typically comprises a sulphate salt. The sulphate salt may be sodium sulphate ($Na_2SO_4$), potassium sulphate ($K_2SO_4$) or ammonium sulphate ($(NH_4)_2SO_4$). It is preferred that the sulphate salt is ammonium sulphate.

The fire extinguishing salt may comprise a carbonate salt. The carbonate salt may be ammonium carbonate ($(NH_4)_2CO_3$), potassium carbonate, sodium carbonate or a mixture of two or more thereof. It is preferred that the carbonate salt is ammonium carbonate ($(NH_4)_2CO_3$), potassium carbonate or a mixture thereof. More preferably, the carbonate salt is ammonium carbonate ($(NH_4)_2CO_3$).

In general, when the fire extinguishing salt comprises a phosphate salt, then typically the total amount of phosphate salt is 15.0 to 50.0% by weight (e.g. 20.0 to 50.0% by weight), preferably 25.0 to 47.5% by weight, such as 27.5 to 45.0% by weight, and even more preferably 30.0 to 42.5% by weight (e.g. 30.0 to 40.0% by weight).

When the phosphate salt comprises a mixture of phosphate salts, then typically at least 50.0% by weight, preferably at least 55.0% by weight, of the mixture of phosphate salts is diammonium phosphate ($(NH_4)_2H_2PO_4$).

Generally, when the fire extinguishing salt comprises a sulphate salt, then typically the total amount of sulphate salt is 2.5 to 15.0% by weight, preferably 4.0 to 12.5% by weight, such as 5.0 to 10.0% by weight, and even more preferably 5.5 to 8.0% by weight (e.g. 6.0 to 7.5% by weight).

As a general feature of the invention, when the fire extinguishing salt comprises a carbonate salt, then typically the total amount of carbonate salt is 0.5 to 15.0% by weight (e.g. 0.5 to 10.0% by weight), preferably 1.0 to 10.0% by weight, such as 1.5 to 7.5% by weight (e.g. 1.5 to 5.0% by weight), and even more preferably 2.5 to 6.0% by weight.

When the carbonate salt comprises a mixture of carbonate salts, then typically at least 60.0% by weight, preferably at least 70.0% by weight, of the mixture of carbonate salts is ammonium carbonate ($(NH_4)_2CO_3$).

For the avoidance of doubt, the total amount of each type of salt (e.g. phosphate salt, sulphate salt or carbonate salt) expressed as a % by weight refers to the % by weight of the fire extinguishing composition, unless the context indicates otherwise.

The fire extinguishing composition may comprise, or consist essentially of, a first fire extinguishing salt and a second fire extinguishing salt. The total amount of fire extinguishing salts (i.e. first fire extinguishing salt and second fire extinguishing salt) are as defined herein. It is preferred the first fire extinguishing salt and the second fire extinguishing salt have different anions. Thus, the fire extinguishing composition may comprise a mixture of different types of fire extinguishing salt.

It is preferred that the first fire extinguishing salt comprises a phosphate salt. The phosphate salt is preferably an ammonium phosphate salt, such as described herein. It is preferred that the ammonium phosphate is selected from monoammonium phosphate ($NH_6PO_4$), diammonium phosphate ($(NH_4)_2HPO_4$) and a mixture thereof. More preferably, the ammonium phosphate salt is diammonium phosphate ($(NH_4)_2H_2PO_4$) or a mixture of diammonium phosphate ($(NH_4)_2H_2PO_4$) and monoammonium phosphate ($NH_6PO_4$). Even more preferably, the ammonium phosphate salt is diammonium phosphate ($(NH_4)_2H_2PO_4$).

When the first fire extinguishing salt comprises a phosphate salt, then typically the fire extinguishing composition comprises the first fire extinguishing salt in a total amount of from 15.0 to 50.0% by weight (e.g. 20.0 to 50.0% by weight), preferably 25.0 to 47.5% by weight, such as 27.5 to 45.0% by weight, and even more preferably 30.0 to 42.5% by weight (e.g. 30.0 to 40.0% by weight).

When the phosphate salt comprises a mixture of phosphate salts, then typically at least 50.0% by weight of the mixture of phosphate salts is diammonium phosphate ($(NH_4)_2H_2PO_4$). More preferably, at least 55.0% by weight, such as at least 60.0% by weight, of the mixture of phosphate salts is diammonium phosphate ($(NH_4)_2H_2PO_4$).

The second fire extinguishing salt may comprise a sulphate salt or a carbonate salt. More preferably, the second fire extinguishing salt comprises ammonium sulphate ($(NH_4)_2SO_4$) or ammonium carbonate ($(NH_4)_2CO_3$).

In one aspect of the invention, the second fire extinguishing salt comprises a carbonate salt, such as defined herein. It is preferred that the carbonate salt is ammonium carbonate ($(NH_4)_2CO_3$), potassium carbonate or a mixture thereof. More preferably, the carbonate salt is ammonium carbonate ($(NH_4)_2CO_3$).

When the second fire extinguishing salt comprises a carbonate salt, then typically the fire extinguishing composition comprises the second fire extinguishing salt in a total amount of from 0.5 to 15.0% by weight (e.g. 0.5 to 10.0% by weight), preferably 1.0 to 10.0% by weight, such as 1.5 to 7.5% by weight (e.g. 1.5 to 5.0% by weight), and even more preferably 2.5 to 6.0% by weight.

When the carbonate salt comprises a mixture of carbonate salts, then typically at least 60.0% by weight of the mixture of carbonate salts is ammonium carbonate ($(NH_4)_2CO_3$). More preferably, at least 70.0% by weight, such as at least 80.0% by weight, of the mixture of carbonate salts is ammonium carbonate ($(NH_4)_2CO_3$).

The fire extinguishing composition may not comprise a fire extinguishing salt that is a sulphate salt.

In another aspect of the invention, the second fire extinguishing salt comprises a sulphate salt, such as defined herein. Thus, it may be preferred that fire extinguishing salts comprise a phosphate salt (e.g. as the first fire extinguishing salt) and a sulphate salt (e.g. as the second fire extinguishing salt), such as a mixture of a phosphate salt and a sulphate salt.

The fire extinguishing composition may not comprise a carbonate salt. Thus, the fire extinguishing salt does not comprise a carbonate salt.

As a general feature of the invention (for all aspects), it is preferred that the fire extinguishing salt comprises an ammonium salt. The ammonium salt may provide a fertiliser for plants after the fire has been extinguished.

The fire extinguishing composition of the invention also comprises a wetting agent. The wetting agent can have an adhesive effect, such that the composition has oppressive behaviour on a surface or object that is on fire or is about to be on fire. The wetting agent may also assist with cooling and extinguishing a fire. The combination of the fire extinguishing salt and the wetting agent are surprisingly efficacious in extinguishing or suppressing large scale fires and may interact synergistically.

The wetting agent typically comprises, or consists essentially of, a surfactant. The surfactant is preferably a non-fluorinated surfactant.

In general, the fire extinguishing composition comprises the wetting agent in an amount of from 0.05 to 10.00% by weight (e.g. 0.50 to 10.00% by weight), preferably from 0.05 to 5.00% by weight (e.g. 1.00 to 5.00% by weight), and more preferably from 0.10 to 3.00% by weight (e.g. 1.25 to 3.00% by weight).

The reference to a "non-fluorinated surfactant" or "fluor-free surfactant" as used herein refers to a surfactant that does not comprise a fluorine atom (i.e. there is not a fluorine atom within the structure of the surfactant molecule, such as in "R" below). Thus, the surfactant comprises an organic compound, which does not have a fluorine atom bonded thereto (e.g. carbon-fluorine (C—F) bond).

Typically, the surfactant is a non-fluorinated compound. Fluorinated compounds can be used in fire extinguishing compositions, but the inclusion of such compounds to extinguish large scale fires is unsuitable, particularly when used to extinguish wild fires. Fluorinated compounds can be biohazardous to many organisms, including plants, or are, at the very least, environmentally unfriendly. The surfactant typically comprises a non-fluorinated hydrocarbon group (e.g. tail) and hydrophilic group (e.g. head).

In general, the wetting agent does not comprise a fluorinated surfactant. It is preferred that the fire extinguishing composition of the invention does not comprise a fluorinated surfactant.

The non-fluorinated surfactant typically provides water or an aqueous solution with a surface tension of ≤35 mN/m at 25° C. when used in an amount of 0.1% by weight, preferably ≤25 mN/m, more preferably ≤20 mN/m. For example, the non-fluorinated surfactant may provide water or an aqueous solution with a surface tension of from 15 to 20 mN/m at 25° C. when used in an amount of 0.1% by weight. The surface tension can be measured using conventional methods, such as by using a surface tensiometer and the Wilhelmy plate method.

The non-fluorinated surfactant may have a density at 20° C. of from 1.01 to 1.25 g/L, preferably 1.02 to 1.20 g/L, more preferably 1.03 to 1.15 g/L (e.g. 1.07 to 1.10 g/L).

Generally, the non-fluorinated surfactant is an anionic surfactant. For the avoidance of doubt, the term "anionic surfactant" refers to a surfactant having an anionic functional group (e.g. the head) or a salt of the anionic functional group or a conjugate acid of the anionic functional group. In solution form, the anionic functional group can be ionised (e.g. present as an anion), but it may be added to the solution in the form of a salt or a conjugate acid thereof.

The anionic surfactant typically comprises a group (e.g. an anionic group) selected from a sulfate group ($R—O—SO_3^-$), a sulfonate group ($R—SO_3^-$), a phosphate group ($R—OPO_3^{2-}$; $(RO)_2PO_2$ etc) and a carboxylate group ($R—CO_2^-$). The group represented by R is an organic side chain that comprises a carbon-hydrogen bond and/or a carbon-carbon bond. Anionic surfactants comprising such anionic groups are known in the art and typically are commercially available.

It is preferred that the anionic surfactant comprises a group (e.g. an anionic group) selected from a sulfate group ($R—O—SO_3^-$) and a sulfonate group ($R—SO_3^-$).

The term "alkyl" or "alkyl group" as used herein refers to a branched or unbranched hydrocarbon chain. The hydrocarbon chain is typically saturated, unless the context indicates otherwise. Representative examples include, but are not limited to, methyl, ethyl, n-propyl, i-propyl, n-butyl, i-butyl, s-butyl, t-butyl, n-pentyl, n-hexyl, n-heptyl, n-octyl, n-nonyl, n-decyl, isopropyl, tert-butyl, isobutyl, etc. A prefix may be used to designate the minimum and maximum number of carbon atoms in the "alkyl" group, e.g. "$C_a$-$C_b$" alkyl refers to an alkyl moiety having the integer "a" to the integer "b" number of carbon atoms, inclusive.

When the anionic surfactant comprises a sulfate group, then the anionic surfactant may, for example, be an alkyl sulfate surfactant or an alkyl ethylene oxide sulfate surfactant (e.g. an alkyl ethoxylated sulfate surfactant).

The alkyl sulfate surfactant typically has a structure represented by formula (1), (1)

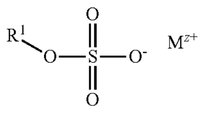

wherein $R^1$ is a linear or branched $C_8$-$C_{20}$ alkyl group, and $M^{z+}$ is a monovalent or divalent cation (e.g. z is an integer selected from 1 and 2). $R^1$ is preferably a linear or branched $C_{10}$-$C_{16}$ alkyl group, more preferably a linear or branched $C_{10}$-$C_{16}$ alkyl group.

Examples of alkyl sulfate surfactants include decyl sulfate (e.g. sodium decyl sulfate), a dodecyl sulfate (e.g. sodium dodecyl sulfate) or a tetradecyl sulfate (e.g. sodium tetradecyl sulfate), such as 7-ethyl-2-methyl-4-undecanyl sulfate (e.g. 7-ethyl-2-methyl-4-undecanyl sulfate sodium salt).

The alkyl ethylene oxide surfactant (e.g. an alkyl ethoxylated sulfate surfactant) may be represented by formula (2), (2)

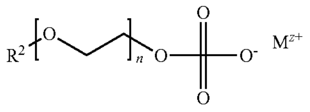

wherein $R^2$ is a linear or branched $C_8$-$C_{20}$ alkyl group; n is an integer greater than 0; and $M^{z+}$ is a monovalent or divalent cation (e.g. z is an integer selected from 1 and 2). $R^2$ is preferably a linear or branched $C_{10}$-$C_{18}$ alkyl group, more preferably a linear or branched $C_{12}$-$C_{16}$ alkyl group, such as a linear or branched $C_{12}$-$C_{14}$ alkyl group.

It is preferred that $R^2$ has an even number of carbon atoms (e.g. $R^2$ is a $C_8$ alkyl group, a $C_{10}$ alkyl group, a $C_{12}$ alkyl group, a $C_{14}$ alkyl group, a $C_{16}$ alkyl group etc).

Typically, n is from 1 to 10, preferably from 1 to 8.

The ethylene oxide moiety in formula (2) above is a repeating unit. Generally, the alkyl ethylene oxide surfactant will comprise a distribution of alkyl ethylene oxide surfactant molecules represented by formula (2). In the distribution, n may have an average (e.g. mean) value of from 1.0 to 5.0, preferably from 1.1 to 2.6, even more preferably 1.2 to 2.5.

Examples of alkyl ethylene oxide sulfate surfactants (an alkyl ethoxylated sulfate surfactants) include a lauryl ether sulfate (e.g. sodium lauryl ether sulfate), a myreth sulfate (e.g. sodium myreth sulfate), a coceth sulfate (e.g. sodium coceth sulfate), or a pareth sulfate (e.g. sodium pareth sulfate).

In formula (1) or formula (2), each $M^{z+}$ may independently be selected from an alkali metal cation (e.g. $Na^+$, $K^+$), an alkali earth metal cation (e.g. $Mg^{2+}$, $Ca^{2+}$) and an ammonium cation (e.g. $NH_4^+$). It is preferred that $M^{z+}$ is a monovalent cation (e.g. z is 1), such that $M^+$ is an alkali metal cation (e.g. $Na^+$, $K^+$) or an ammonium cation (e.g. $NH_4^+$). More preferably, $M^{z+}$ is an alkali metal cation, particularly a sodium cation ($Na^+$).

In general, when $M^{z+}$ is a divalent cation, then two alkyl sulfate surfactant anions will be present to ensure charge neutrality.

Generally, it is preferred that the alkyl group for $R^1$ and/or $R^2$ is an unsubstituted alkyl group (i.e. there are no substituents on the alkyl group other than those shown in formula (1) or (2)).

The anionic surfactant comprising a sulfate group may, for example, be selected from a decyl sulfate (e.g. sodium decyl sulfate), a dodecyl sulfate (e.g. sodium dodecyl sulfate), a lauryl ether sulfate (e.g. sodium lauryl ether sulfate), a myreth sulfate (e.g. sodium myreth sulfate), a coco sulfate (e.g. sodium coco sulfate), a coceth sulfate (e.g. sodium coceth sulfate), a pareth sulfate (e.g. sodium pareth sulfate) and a mixture of two or more thereof. When the anionic surfactant comprises a sulfate group, it is preferred that the anionic surfactant comprising a sulfate group is a decyl sulfate (e.g. sodium decyl sulfate), a dodecyl sulfate (e.g. sodium dodecyl sulfate), a lauryl ether sulfate (e.g. sodium lauryl ether sulfate) or a mixture of two or more thereof, particularly a decyl sulfate.

In general, it is preferred that the anionic surfactant comprising a sulfate group is an alkyl sulfate surfactant, an alkyl ethylene oxide sulfate surfactant (e.g. an alkyl ethoxylate sulfate surfactant) or a mixture of an alkyl sulfate surfactant and an alkyl ethylene oxide sulfate surfactant.

When the anionic surfactant comprising a sulfate group is an alkyl sulfate surfactant, then preferably the alkyl sulfate surfactant is a decyl sulfate, a tetradecyl sulfate or a mixture thereof, such as sodium decyl sulfate, sodium tetradecyl sulfate or a mixture thereof, more preferably the alkyl sulfate surfactant is a decyl sulfate (e.g. sodium decyl sulfate).

When the anionic surfactant comprising a sulfate group is an alkyl ethylene oxide sulfate surfactant, then preferably the alkyl ethylene oxide sulfate surfactant is a dodecyl ethoxylated sulfate, a tetradecyl ethoxylated sulfate or a mixture thereof, such as dodecyl ethoxylated sulfate sodium salt, tetradecyl ethoxylated sulfate sodium salt or a mixture thereof.

When the anionic surfactant comprising a sulfate group is mixture of an alkyl sulfate surfactant and an alkyl ethylene oxide sulfate surfactant, the preferably the anionic surfactant comprising a sulfate group is a mixture of a decyl sulfate, a tetradecyl sulfate, a dodecyl ethoxylated sulfate and a tetradecyl ethoxylated sulfate.

When the anionic surfactant comprises a sulfonate group, then the anionic surfactant may, for example, be an alkyl sulfonate, a sulfosuccinate ester surfactant or an alkyl benzene sulfonate surfactant.

The alkyl sulfonate surfactant typically has a structure represented by formula (A1) or (A2), (A1)

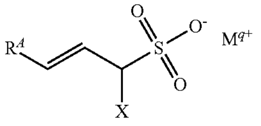

(A2)

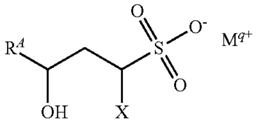

wherein:

$R^A$ is a linear or branched $C_5$-$C_{15}$ alkyl group;

X is hydrogen or —$CH_2SO_3^-$; and $M^{q+}$ is a monovalent or divalent cation (e.g. q is an integer selected from 1 and 2).

$R^A$ is preferably a linear or branched $C_7$-$C_{15}$ alkyl group, more preferably a linear or branched $C_9$-$C_{13}$ alkyl group, such as a linear or branched $C_{12}$-$C_{14}$ alkyl group.

It is preferred that $R^A$ has an odd number of carbon atoms (e.g. $R^A$ is a $C_5$ alkyl group, a $C_7$ alkyl group, a $C_9$ alkyl group, a $C_{11}$ alkyl group, a $C_{13}$ alkyl group etc).

When X is —$CH_2SO_3^-$, then the alkyl sulfonate surfactant is an alkyl disulfonate surfactant.

It is preferred that X is hydrogen.

The sulfosuccinate ester surfactant typically has a structure represented by formula (1), (B1)

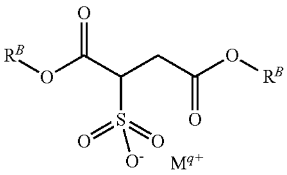

wherein each $R^B$ is the same or different and is independently selected from a linear or branched $C_6$-$C_{18}$ alkyl group; and $M^{q+}$ is a monovalent or divalent cation (e.g. q is an integer selected from 1 and 2). Each $R^B$ is the same or different and is preferably independently selected from a linear or branched $C_7$-$C_1$ alkyl group, more preferably a linear or branched $C_8$-$C_{14}$ alkyl group.

In general, it is preferred that the $R^B$ are the same.

The alkyl benzene sulfonate surfactant typically has a structure represented by formula (C1), (C1)

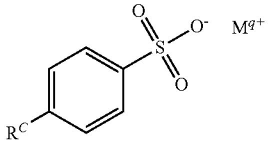

wherein $R^C$ is a linear or branched $C_6$-$C_{18}$ alkyl group, and $M^{q+}$ is a monovalent or divalent cation (e.g. q is an integer selected from 1 and 2). $R^c$ is preferably a linear or branched $C_8$-$C_{16}$ alkyl group, more preferably a linear or branched $C_{10}$-$C_{14}$ alkyl group In formulae (A1), (A2), (1) or (C1), each $M^{q+}$ may independently be selected from an alkali metal cation (e.g. $Na^+$, $K^+$), an alkali earth metal cation (e.g. $Mg^{2+}$, $Ca^{2+}$) and an ammonium cation (e.g. $NH_4^+$). It is preferred that $M^{q+}$ is a monovalent cation (e.g. q is 1), such that $M^+$ is an alkali metal cation (e.g. $Na^+$, $K^+$) or an ammonium cation (e.g. $NH_4^+$). More preferably, $M^{q+}$ is an alkali metal cation, particularly a sodium cation ($Na^+$).

Generally, it is preferred that each alkyl group for $R^A$, $R^B$ and $R^C$ is an unsubstituted alkyl group (i.e. there are no substituents on the alkyl group other than those shown in formulae (A1), (A2), (1) or (C1).

The stoichiometry of the sulfonate surfactant anion and $M^{q+}$ will be such that there is charge neutrality.

The anionic surfactant comprising a sulfonate group may be selected from a tetradec-2-ene-1-sulfonate (e.g. sodium tetradec-2-ene-1-sulfonate), a hexadec-2-ene-1-sulfonate (e.g. sodium hexadec-2-ene-1-sulfonate), a 3-hydroxytetradecane-1-sulfonate (e.g. sodium 3-hydroxytetradecane-1-sulfonate), 3-hydroxyhexadecane-1-sulfonate (e.g. sodium 3-hydroxyhexadecane-1-sulfonate), tetradec-3-ene-1,2-disulfonate (e.g. disodium tetradec-3-ene-1,2-disulfonate), hexadec-3-ene-1,2-disulfonate (e.g. disodium hexadec-3-ene-1,2-disulfonate), a hydroxytetradecanedisulfonate (e.g. disodium hydroxytetradecanedisulfonate), a hydroxyhexadecanedisulfonate (e.g. disodium hydroxyhexadecanedisulfonate), a dioctyl sulfosuccinate (e.g. dioctyl sulfosuccinate sodium salt), a dodecylbenzenesulfonate (e.g. dodecylbenzenesulfonate sodium salt), a methyl dodecylbenzenesulfonate (e.g. methyl dodecylbenzenesulfonate sodium salt), a 1-hexadecanesulfonate (e.g. sodium 1-hexadecanesulfonate and a mixture of two or more thereof. It is preferred that the anionic surfactant comprising a sulfonate group is a tetradec-2-ene-1-sulfonate, a hexadec-2-ene-1-sulfonate, a 3-hydroxytetradecane-1-sulfonate, 3-hydroxyhexadecane-1-sulfonate, tetradec-3-ene-1,2-disulfonate, hexadec-3-ene-1,2-disulfonate, a hydroxytetradecane-disulfonate, a hydroxyhexadecanedisulfonate or a mixture of two or more thereof.

Generally, it is preferred that the non-fluorinated surfactant (e.g. anionic surfactant) comprises a group (e.g. an anionic group) selected from a sulfate group (R—O—$SO_3^-$), a sulfonate group (R—$SO_3^-$) and a phosphate group (R—$OPO_3^{2-}$; $(RO)_2PO_2^-$ etc). More preferably, the group is selected from a sulfate group (R—O—$SO_3^-$) and a sulfonate group (R—$SO_3^-$). The group may preferably be a sulfate group (R—O—$SO_3^-$). Alternatively, the group is preferably a sulfonate group (R—$SO_3^-$).

When the anionic surfactant is in the form of a salt, then the anionic surfactant may have a counter cation that is an alkali metal, an alkaline earth metal or an ammonium cation (e.g. $NH_4^+$). It is preferred that the counter cation for each anionic surfactant is selected from a sodium cation, a potassium cation and an ammonium cation, particularly a sodium cation.

The wetting agent typically comprises the surfactant (e.g. non-fluorinated surfactant) in a total amount of ≥5.00% by weight of the wetting agent, such as ≥7.50% by weight of the wetting agent (e.g. ≥10.00% by weight). It is preferred that the wetting agent comprises the surfactant in a total amount of ≥15.00% by weight of the wetting agent, such as ≥20.00% by weight, more preferably ≥25.00% by weight (e.g. ≥35.00% by weight), even more preferably ≥45.00% by weight.

For the avoidance of doubt, the amount refers to the total amount of surfactant (e.g. non-fluorinated surfactant) is expressed in terms of the % by weight of the wetting agent, and refers to the total amount of surfactant, preferably anionic surfactant, even when there is a plurality of surfactants (e.g. a first surfactant and a second surfactant, as described below). The % by weight of each surfactant is to be calculated on the basis of the sodium salt of the surfactant.

In general, the wetting agent comprises the surfactant (e.g. non-fluorinated surfactant) in a total amount of ≤90.00% by weight, such as ≤80.00% by weight. It is preferred that the wetting agent comprises the surfactant in a total amount of ≤75.00% by weight, more preferably ≤60.00% by weight.

Typically, the wetting agent comprises a total amount of the surfactant (e.g. non-fluorinated surfactant) of 20.00 to 90.00% by weight of the wetting agent (e.g. 25.00 to 90.00% by weight), preferably 25.00 to 80.00% by weight (e.g. 35.00 to 80.00% by weight), more preferably 35.00 to 75.00% by weight, and even more preferably 45.00 to 60.00% by weight.

In one aspect, the wetting agent comprises the surfactant in a total amount of ≤50.00% by weight, such ≤45.00% by weight, preferably ≤35.00% by weight.

In this aspect, the wetting agent may comprise a total amount of the surfactant (e.g. non-fluorinated surfactant) of 5.00 to 75.00% by weight of the wetting agent (e.g. 7.50 to 75.00% by weight), preferably 10.00 to 60.00% by weight, such as 15.00 to 50.00% by weight, such as 20.00 to 45.00% by weight, and even more preferably 25.00 to 35.00% by weight.

In general, the wetting agent may comprise, or consist essentially of, a plurality of surfactants, such as a plurality of non-fluorinated surfactants. The plurality of surfactants may, for example, be 2, 3 or 4 surfactants. Each surfactant of the plurality of surfactants may be as described above.

The wetting agent may comprise, or consist essentially of, a first surfactant and a second surfactant. Typically, the first surfactant is a non-fluorinated surfactant and the second surfactant is a non-fluorinated surfactant.

The first surfactant comprises a sulfonate group and the second surfactant comprises a sulfate group.

Typically, the wetting agent can comprise a ratio by weight of the first surfactant to the second surfactant of from 10:1 to 1:10 (e.g. 2:1 to 1:10), such as 5:1 to 1:5. When the first surfactant is a mixture of surfactants comprising a sulfonate group and/or the second surfactant is a mixture of surfactants comprising a sulfate group, then the ratio by weight is a ratio of the total weight of the first surfactant (e.g. when the first surfactant comprises a mixture of surfactants) and the total weight of the second surfactant (e.g. when the second surfactant comprises a mixture of surfactants). It may be preferable for the amount by weight of the first surfactant to exceed the amount by weight of the second surfactant.

The wetting agent preferably comprises a ratio by weight of the first surfactant to the second surfactant of from 7.5:1 to 1.1:1, more preferably 5:1 to 1.5:1.

In general, the first surfactant comprising a sulfonate group is preferably an alkyl sulfonate surfactant or a sulfosuccinate ester, such as described herein.

When the first surfactant comprising a sulfonate group is an alkyl sulfonate surfactant, then preferably the alkyl sulfonate surfactant is a tetradec-2-ene-1-sulfonate, a hexadec-2-ene-1-sulfonate, a 3-hydroxytetradecane-1-sulfonate, 3-hydroxyhexadecane-1-sulfonate, tetradec-3-ene-1,2-disulfonate, hexadec-3-ene-1,2-disulfonate, a hydroxytetradecane-disulfonate, a hydroxyhexadecanedisulfonate or a mixture of two or more thereof. More preferably, the first surfactant is a mixture of tetradec-2-ene-1-sulfonate, a hexadec-2-ene-1-sulfonate, a 3-hydroxytetradecane-1-sulfonate, 3-hydroxyhexadecane-1-sulfonate, tetradec-3-ene-1,2-disulfonate, hexadec-3-ene-1,2-disulfonate, a hydroxytetradecane-disulfonate and a hydroxyhexadecane-disulfonate, such as the sodium salts of these compounds.

When the first surfactant comprising a sulfonate group is a sulfosuccinate ester, then preferably the sulfosuccinate ester is a docusate surfactant (e.g. dioctyl sulfosuccinate), such as sodium docusate.

The wetting agent may comprise a total amount of the first surfactant of 5.00 to 50.00% by weight of the wetting agent (e.g. 5.00 to 25.00% by weight), preferably 10.00 to 45.00% by weight (e.g. 10.00 to 40.00% by weight) of the wetting agent, preferably 15.00 to 35.00% by weight (e.g. 15.00 to 25.00% by weight) of the wetting agent.

The second surfactant comprising a sulfate group may be an alkyl sulfate surfactant or an alkyl ethylene oxide sulfate surfactant.

In general, the second surfactant comprising a sulfate group is preferably a decyl sulfate, a dodecyl sulfate, a lauryl ether sulfate or a mixture of two or more thereof. More preferably, the second surfactant comprises, or consists essentially of, a decyl sulfate.

When the first surfactant is an alkyl sulfonate surfactant, then preferably the second surfactant is an alkyl sulfate surfactant. It is preferred that the alkyl sulfate surfactant is a decyl sulfate surfactant, such as sodium decyl sulfate.

When the first surfactant is an alkyl sulfonate surfactant and the second surfactant is an alkyl sulfate surfactant, then the wetting agent may comprise a ratio by weight of the first surfactant to the second surfactant of from 7.5:1 to 1.1:1, more preferably 5:1 to 1.5:1.

When the first surfactant is a sulfosuccinate ester, then preferably the second surfactant is an alkyl ethylene oxide sulfate surfactant. It is preferred that the alkyl ethylene oxide sulfate surfactant comprises, or consists essentially of, a lauryl ether sulfate, such as sodium lauryl ether sulfate.

When the first surfactant is a sulfosuccinate ester and the second surfactant is an alkyl ethylene oxide sulfate surfactant, then the wetting agent may comprise a ratio by weight of the first surfactant to the second surfactant of from 2:1 to 1:13.0, more preferably 1:1 to 1:5.

Typically, the wetting agent may comprise a total amount of the second surfactant of 5.00 to 65.00% by weight of the wetting agent, preferably 7.50 to 45.00% by weight of the wetting agent, more preferably 10.00 to 25.00% by weight of the wetting agent.

In one aspect, the wetting agent may comprise a total amount of the second surfactant of 1.00 to 20.00% by weight of the wetting agent, preferably 5.00 to 10.00% by weight of the wetting agent.

Generally, the wetting agent comprises, or consists essentially of, a non-fluorinated surfactant and a protic solvent. Thus, the wetting agent may comprise, or consist essentially of, a first surfactant, a second surfactant and a protic solvent. For the avoidance of doubt, the protic solvent is not water.

The protic solvent is typically an alcohol. The alcohol may assist in solubilising the fire extinguishing salt in water and/or may assist with the foaming of the wetting agent.

The alcohol may, for example, be a glycol.

The alcohol is typically selected from ethanol, ethylene glycol, propylene glycol, 1-butoxyethoxy-2-propanol, 2-(2-butoxyethoxy)-ethanol, glycerine, hexylene glycol, polyethylene glycol, dodecan-1-ol, tetradecanol and a combination of two or more thereof. It is preferred that the alcohol comprises, or consists essentially of, 2-(2-butoxyethoxy)-ethanol and optionally dodecan-1-ol and/or tetradecanol. 2-(2-butoxyethoxy)-ethanol may also assist with preserving the fire extinguishing composition.

The wetting agent typically comprises the protic solvent, particularly an alcohol, in a total amount of 20.00 to 70.00% by weight of the wetting agent, preferably 25.00 to 55.00% by weight of the wetting agent, more preferably 25.00 to 50.00% by weight of the wetting agent (e.g. 25.00 to 45.00% by weight).

The surfactant, such as the first surfactant and the second surfactant, of the wetting agent may be the only surfactant of the fire extinguishing composition. Thus, the only surfactant included in the fire extinguishing composition is from the wetting agent.

The fire extinguishing composition may further comprise a polyether. The polyether may also assist in solubilising the fire extinguishing salt in water and/or may also assist with foaming.

When the fire extinguishing composition comprises a polyether, then the amount of polyether is typically from 0.01 to 0.25% by weight of the fire extinguishing composition, preferably 0.05 to 0.20% by weight, more preferably 0.10 to 0.15% by weight.

The polyether may be selected from an ethylene glycol monoalkyl ether, a diethylene glycol monoalkyl ether, a propylene glycol monoalkyl ether, a dipropylene glycol monoalkyl ether, a triethylene glycol monoalkyl ether and a combination of two or more thereof. Any reference to a "monoalkyl ether" as herein in the context of a polyether typically refers to a monoethyl ether, a monopropyl ether or a monobutyl ether, preferably a monobutyl ether.

The fire extinguishing composition may comprise a preservative. The preservative may be a biocide (e.g. fungicide or anti-microbial).

The preservative may be selected from 5-chloro-2-methyl-2H-isothiazol-3-one, 2-methyl-2H-isothiazol-3-one, 4-chloro-2-[(5-chloro-2-hydroxyphenyl)methyl]phenol and a combination of two or more thereof. It is preferred that the preservative is 5-chloro-2-methyl-2H-isothiazol-3-one and/or 2-methyl-2H-isothiazol-3-one.

Typically, the amount (i.e. total amount) of preservative is 0.05 to 0.60% by weight, preferably 0.10 to 0.50% by weight, more preferably 0.30 to 0.40% by weight.

The fire extinguishing composition may or may not further comprise a non-ionic surfactant. The non-ionic surfactant is typically a non-fluorinated surfactant.

The non-ionic surfactant is preferably an alkyl polyglycoside. The non-ionic surfactant may be included in the composition to enhance wetting formation and/or to stabilise any foam that is formed. For the avoidance of doubt, the non-ionic surfactant is different (i.e. different compound) to the surfactant of the wetting agent.

When the fire extinguishing composition comprises a non-ionic surfactant, then the amount of non-ionic surfactant is typically from 0.005 to 0.05% by weight, preferably 0.01 to 0.03% by weight.

The fire extinguishing composition may be a solid or a liquid. When the fire extinguishing composition is a solid, then it may be in the form of a powder. When the fire extinguishing composition is a liquid, then it may be a foam, a solution or a dispersion. The solution or dispersion may be a foamable composition. It is preferred that the composition is a liquid, preferably a solution.

Typically, the fire extinguishing composition has a specific gravity (with reference to water at, for example, 20° C.) of from 1.05 to 1.30, such as 1.10 to 1.25.

The invention also relates to a fire extinguisher product, which comprises a container comprising the fire extinguishing composition. The container may be portable.

The container may be a package. The package may be a ball or a bomb. The ball or bomb is for dropping onto a fire or for being thrown or propelled as a projectile onto the fire. An aerial vehicle, such as a plane, a helicopter or a drone, may drop the package onto a fire.

Typically, the package is a disposable package.

The container may be a pressurised cannister. The pressurised cannister may have a nozzle for administering or applying the fire extinguishing composition.

The pressurised cannister may comprise a propellant, such as carbon dioxide or nitrogen, preferably nitrogen.

When the container is portable, the fire extinguisher product may be a hand-held fire extinguisher.

The container may be part of a vehicle. Thus, the vehicle may have a compartment (e.g. the container) for storing and/or dispensing the fire extinguishing composition, such as the cargo hold of an aerial vehicle for fighting fires. The vehicle may, for example, be an off-read vehicle (e.g. tank), a road vehicle for fighting fires (e.g. fire truck) or an aerial vehicle (e.g. a helicopter, plane or drone, particularly an industrial drone).

The fire extinguisher product may have a dispenser, such as a hose, coupled to the container. The dispenser is for the delivery of the fire extinguishing composition to the fire.

The invention also provides a method of manufacturing a fire extinguishing composition. The fire extinguishing composition can be prepared using conventional methods.

The invention further relates to a method of manufacturing a fire extinguishing composition. The method comprises mixing a fire extinguishing salt with a wetting agent in water, such that the fire extinguishing composition comprises water in an amount of ≤80.0% by weight and the fire extinguishing salt in an amount of 15.0% by weight.

The method mixing of the fire extinguishing salt with the wetting agent in water include adding a fire extinguishing salt to water (e.g. to form a mixture). The wetting agent may be added to water either before, after or concurrently with the addition of the fire extinguishing salt. The ingredients (e.g. the fire extinguishing salt, the wetting agent and water) are mixed or blended to produce the fire extinguishing composition.

The ingredients of the fire extinguishing composition are blended together, and are included in precise amounts (e.g. the amount of each ingredient may be measured up to 10 decimal places). Depending on the manufacturing scale and the ingredient being added, the blending procedure requires the inclusion of precise amounts of ingredients that may be added at a certain time. The speed of blending can depend on the ingredients that are added and their method of addition. The ingredient being added may require a different speed of blending and/or rate of addition of the ingredient. For example, material A can be added as fast as possible into the mix, but material C may need to be added gradually in quantity. It may be necessary to add portions of an ingredient during the method of manufacture. For example, Material A may be included in a total amount (e.g. 4.89766%) in the composition, but it may be necessary to add a first portion of this ingredient (e.g. 2.68453%) at the start, the end or during the middle of the blending process and it may be necessary to add the remaining the balance (e.g. 2.21313%) during a different time in the blending process, to ensure that the ingredient is in solution and for it to provide the desired effect.

The invention also provides a method of extinguishing a fire. The method comprises administering or applying the fire extinguishing composition to the fire. The fire extinguishing composition may be administered or applied to the fire using the fire extinguisher product. The fire extinguishing composition can be administered or applied in the same way as a conventional fire extinguishant, depending on the form of the fire extinguishing composition of the invention.

The container comprising the fire extinguishing product may be applied or administered to the fire by dropping the container onto the fire or by throwing or propelling the container onto the fire, such as when the container is a package. The container may be dropped from an aerial vehicle, such as a drone, a helicopter or a plane, onto the fire.

When the container is part of a vehicle cargo (e.g. hold of an aerial vehicle for fighting fires), then the fire extinguishing product may be applied or administered to a fire by opening the doors to the container, such as when an aerial vehicle is near or over the fire.

The fire extinguisher product may be used to apply or administer the fire extinguishing composition to a fire by dispensing the fire extinguishing composition onto the fire. For example, the fire extinguisher product can dispense the fire extinguishing composition onto the fire, such by using the dispenser of the fire extinguishing product.

The invention also relates to the use of the fire extinguishing composition to extinguish a fire and/or to reduce or prevent a fire from spreading.

The amount of fire extinguishing composition needed to extinguish a fire or to reduce or prevent a fire from spreading will depend upon the nature and extent of the fire. The fire extinguishing composition of the invention may rapidly extinguish the fire using a relatively low quantity of the composition, particularly when compared to conventional fire extinguishing compositions.

The fires are classed as a Class A fire. The term “class A fire” as used herein refers to a fire caused by the burning of a solid combustible material. Examples of solid combustible materials include wood, paper, charcoal, plastic and textiles.

Additionally or alternatively, the invention also relates to the use of the fire extinguishing composition as a fertilising agent for plant growth (e.g. re-growth of plants that have been damaged by the fire). The nature of some of the materials, alongside water, have fertilising capabilities, so by their very nature can provide fertilising for enhanced plant growth retention when used.

Any reference to “comprising” as used herein has an open meaning and embraces the semi-closed term “consisting essentially of” and the closed term “consisting of”. Any reference to “comprising” as used herein may be replaced with the semi-open term “consisting essentially of”. Any reference to the term “consisting essentially of” may be replaced with the close term “consisting of”.

EXAMPLES

The invention will now be illustrated by the following non-limiting examples.

Example 1

A fire extinguishing composition was prepared as shown in Table 1 below (amounts shown in % by weight).

TABLE 1

| Ingredient | Amount (% by weight) |
|---|---|
| Fire extinguishing salt | 20.0-40.0 |
| Wetting agent | 0.1-3.0 |
| Water | balance |

The fire extinguishing salt in Table 1 is composed of a mixture of phosphate salts and carbonate salts. The phosphate salts made up 85% by weight of the total weight of the fire extinguishing salts, with the remainder being carbonate salts. The wetting agent in Table 1 is composed of protic solvent (total weight about 50% by weight of the wetting agent), an alkyl sulfate surfactant (about 15% by weight of the wetting agent) and an alkyl sulfonate surfactant (about 35% by weight of the wetting agent).

The fire extinguishing composition was tested by setting alight 10 scrap cars. A firefighting operator was tasked with extinguishing each car with a 9-litre fire extinguisher. Fire extinguishers containing the composition from Table 1 were used to put out the flames and the results are shown in Table 2 below. By way of comparison, a firefighter uses between 1,800 to 2,000 litres of water to put out these fires and it would take 45 minutes to an hour for each fire to be extinguished with no re-ignition.

TABLE 2

| Car No. | Amount of composition (litres) | Time Efficiency (%) | Time Taken (Seconds) |
|---|---|---|---|
| 1 | 9 | 200 | 43 |
| 2 | 9 | 200 | 56 |
| 3 | 27 | 67 | 122 |
| 4 | 18 | 100 | 78 |
| 5 | 9 | 200 | 32 |
| 6 | 9 | 200 | 41 |
| 7 | 9 | 200 | 53 |
| 8 | 9 | 200 | 21 |
| 9 | 18 | 100 | 92 |
| 10 | 9 | 200 | 53 |

Example 2

The fire extinguishing composition from Table 1 (referred as “T1” in the table below) was tested against straw bales. Specifically, 4 rows of bales were laid out, 13 metres in length, 2 metres wide and 12-18 inches high to replicate a small wildfire and to test the fire extinguishing composition's retardant capability. Fire extinguishing compositions were then used to restrict out the flames. Each row of bales was lit and was placed to see how far the fire travelled up each row. The results are shown in Table 3 below.

TABLE 3

| Row No. | Composition | Fire Travelled (Metres) | Time Taken (minutes) | Result |
|---|---|---|---|---|
| 1 | Water only | 13 | 18 | 100% of bale was burned |
| 2 | 5% T1, 95% water | 5.5 | 60 | Fire still smouldering but being held back |
| 3 | 10% T1, 90% water | 5.3 | 60 | Fire still smouldering but being held back |
| 4 | 100% T1 | 3.4 | 60 | Completely stopped fire |

In Row 1, water was used. A diluted fire extinguishing composition (5% composition and 95% water by volume) was used in Row 2. In Row 3, a diluted fire extinguishing composition (10% composition and 90% water by volume). Row 4 was extinguished using 100% of the fire extinguishing composition.

Example 3

Two sections of 1×1 metre square of ground were set alight and burnt. One of the sections was extinguished with water, and the other was extinguished with the fire extinguishing composition from Table 1. Each section of ground was left for 3 months to see results, which are shown in Table 4.

TABLE 4

| Extinguishing composition | Observation |
|---|---|
| Water | No visible plant growth |
| From Table 1 | Visible plant growth |

The invention claimed is:

1. A fire extinguishing composition comprising:
water in an amount of 35.0% by weight to 70.0% by weight;
a fire extinguishing salt comprising a phosphate salt selected from monoammonium phosphate $((NH_4)(H_2PO_4))$, diammonium phosphate $((NH_4)_2(HPO_4))$, and a mixture thereof, in an amount of 30.0 to 50.0% by weight, and a carbonate salt; and
a wetting agent comprising a non-fluorinated surfactant;
wherein the fire extinguishing composition does not comprise a fluorinated surfactant.

2. The fire extinguishing composition according to claim 1, wherein the wetting agent is in an amount of from 0.05 to 10.00% by weight.

3. The fire extinguishing composition according to claim 1, wherein the non-fluorinated surfactant is in a total amount of ≥5.00% by weight of the wetting agent.

4. The fire extinguishing composition according to claim 1, wherein the non-fluorinated surfactant is an anionic surfactant.

5. The fire extinguishing composition according to claim 1, wherein the total amount of surfactant as 20.00 to 45.00% by weight of the wetting agent.

6. The fire extinguishing composition according to claim 1, wherein the wetting agent further comprises a protic solvent.

7. The fire extinguishing composition according to claim 6, wherein the protic solvent is an alcohol.

8. The fire extinguishing composition according to claim 6, wherein the protic solvent is an alcohol selected from ethanol, ethylene glycol, propylene glycol, 1-butoxyethoxy-2-propanol, 2-(2-butoxyethoxy)-ethanol, glycerine, hexylene glycol, polyethylene glycol, dodecan-1-ol, tetradecanol, and a combination of two or more thereof.

9. The fire extinguishing composition according to claim 1, wherein the phosphate salt is diammonium phosphate.

10. The fire extinguishing composition according to claim 1, wherein fire extinguishing salt comprises a sulphate salt.

11. The fire extinguishing composition according to claim 10, wherein the sulphate salt is in an amount of 2.5 to 15.0% by weight.

12. The fire extinguishing composition according to claim 1, wherein the carbonate salt is ammonium carbonate $((NH_4)_2CO_3)$, potassium carbonate $(K_2CO_3)$, or a mixture thereof.

13. The fire extinguishing composition according to claim 1, wherein the carbonate salt is in a total amount of from 0.5 to 15.0% by weight.

14. The fire extinguishing composition according to claim 1, which comprises a non-ionic surfactant.

15. The fire extinguishing composition according to claim 1, wherein the wetting agent is in an amount of from 0.10 to 3.00% by weight.

16. The fire extinguishing composition according to claim 1, wherein the non-fluorinated surfactant is an anionic surfactant comprising a group selected from a sulfate group and a sulfonate group.

17. The fire extinguishing composition according to claim 1, wherein the wetting agent comprises a first surfactant and a second surfactant, wherein the first surfactant comprises a sulfonate group and the second surfactant comprises a sulfate group.

18. The fire extinguishing composition according to claim 17, wherein the first surfactant is tetradec-2-ene-1-sulfonate, hexadec-2-ene-1-sulfonate, 3- hydroxytetradecane-1-sulfonate, 3-hydroxyhexadecane-1-sulfonate, tetradec-3-ene-1,2- disulfonate, hexadec-3-ene-1,2-disulfonate, hydroxytetradecane-disulfonate, hydroxyhexadecanedisulfonate, or a mixture of two or more thereof.

19. The fire extinguishing composition according to claim 17, wherein the second surfactant is decyl sulfate, dodecyl sulfate, lauryl ether sulfate, or a mixture of two or more thereof.

20. The fire extinguishing composition according to claim 17, wherein the wetting agent comprises a total amount of the first surfactant of 10.00 to 40.00% by weight of the wetting agent.

21. The fire extinguishing composition according to claim 17, wherein the wetting agent comprises a total amount of the second surfactant of 1.00 to 20.00% by weight of the wetting agent.

22. The fire extinguishing composition according to claim 17, wherein the first surfactant is an alkyl sulfonate surfactant or a sulfosuccinate ester surfactant.

23. The fire extinguishing composition according to claim 22, wherein the wetting agent comprises a total amount of the first surfactant of 5.00 to 50.00% by weight of the wetting agent.

24. The fire extinguishing composition according to claim 22, wherein the wetting agent comprises a total amount of the first surfactant of 10.00 to 45.00% by weight of the wetting agent.

25. The fire extinguishing composition according to claim 17, wherein the second surfactant is an alkyl sulfate surfactant or an alkyl ethylene oxide sulfate surfactant.

26. The fire extinguishing composition according to claim 25, wherein the wetting agent comprises a total amount of the second surfactant of 5.00 to 65.00% by weight of the wetting agent.

27. The fire extinguishing composition according to claim 25, wherein the wetting agent comprises a total amount of the second surfactant of 7.50 to 45.00% by weight of the wetting agent.

28. The fire extinguishing composition according to claim 17, wherein the first surfactant is an alkyl sulfonate surfactant and the second surfactant is an alkyl sulfate surfactant.

29. The fire extinguishing composition according to claim 17, wherein the first surfactant is a sulfosuccinate ester surfactant and the second surfactant is an alkyl ethylene oxide sulfate surfactant.

30. The fire extinguishing composition according to claim 17, wherein the wetting agent comprises a total amount of the surfactant of 20.00 to 90.00% by weight of the wetting agent.

31. The fire extinguishing composition according to claim 17, wherein the wetting agent comprises a total amount of the first surfactant of 15.00 to 25.00% by weight of the wetting agent.

32. The fire extinguishing composition according to claim 17, wherein the wetting agent comprises a total amount of the second surfactant of 5.00 to 10.00% by weight of the wetting agent.

33. The fire extinguishing composition according to claim 17, wherein the wetting agent comprises a total amount of the surfactant of 45.00 to 60.00% by weight of the wetting agent.

34. A fire extinguisher product comprising a container, wherein the container comprises a fire extinguishing composition of claim 1.

35. A method of extinguishing a fire comprising administering or applying a fire extinguishing composition of claim 1 to the fire.

* * * * *